USO09529489B2

United States Patent
Chiang et al.

(10) Patent No.: US 9,529,489 B2
(45) Date of Patent: Dec. 27, 2016

(54) METHOD AND APPARATUS OF TESTING A COMPUTER PROGRAM

(71) Applicant: International Business Machines Corporation, Armonk, NY (US)

(72) Inventors: Micky Wei-Te Chiang, Taipei (TW); Chao Yuan Huang, Taipei (TW); Qiang Song, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 13/949,366

(22) Filed: Jul. 24, 2013

(65) Prior Publication Data

US 2014/0033097 A1    Jan. 30, 2014

(30) Foreign Application Priority Data

Jul. 30, 2012   (CN) .......................... 2012 1 0266218

(51) Int. Cl.
*G06F 3/048*    (2013.01)
*G06F 3/0481*   (2013.01)
*G06F 11/36*    (2006.01)

(52) U.S. Cl.
CPC ......... *G06F 3/0481* (2013.01); *G06F 11/3672* (2013.01)

(58) Field of Classification Search
CPC .............. G06F 3/0481; G06F 17/30528; G06F 17/30554; G06F 17/30557; G06F 17/211; G06F 11/3672
See application file for complete search history.

(56) References Cited

U.S. PATENT DOCUMENTS 5,754,873 A  *  5/1998  Nolan .................. G06F 3/0481
                                            345/472
6,452,597 B1 *  9/2002  Goldberg et al. ............. 345/472
(Continued)

FOREIGN PATENT DOCUMENTS

CN        101154238 A      4/2008
CN        102314300 A      1/2012

OTHER PUBLICATIONS

Morten Hjerde; The Anatomy of a text input field; © 2008; Sender 11; http://sender11.typepad.com/sender11/2008/06/the-anatomy-o-1.html; seven pages.*

*Primary Examiner* — Linh K Pham
(74) *Attorney, Agent, or Firm* — Brian J. Colandreo, Esq.; Jeffrey T. Placker, Esq.; Holland & Knight LLP

(57) ABSTRACT

Embodiments of the disclosure may provide a method and apparatus of testing a computer program. The method may include acquiring first display data of a character region in a Graphical User Interface (GUI) of the computer program. The method may also include reducing display size setting of an original character string associated with the character region. The method may also include acquiring second display data of the character region in refreshed GUI. The method may further include generating a message indicating character truncation when there is a difference other than actual display size of character between the first display data and the second display data. With the technical solution provided by embodiments of the disclosure, character truncation existing in a GUI may be automatically detected.

8 Claims, 10 Drawing Sheets

(56) References Cited

U.S. PATENT DOCUMENTS

| | | | |
|---|---|---|---|
| 6,473,524 B1* | 10/2002 | Reda | G06K 9/344 |
| | | | 382/178 |
| 7,697,001 B2* | 4/2010 | Lin | G06F 17/214 |
| | | | 345/173 |
| 7,752,501 B2 | 7/2010 | Bak | |
| 7,756,886 B1 | 7/2010 | Murugesan et al. | |
| 8,090,202 B2* | 1/2012 | Konno | G06F 17/211 |
| | | | 382/173 |
| 8,185,846 B2* | 5/2012 | Kuwahara | G05B 19/409 |
| | | | 715/866 |
| 2001/0041005 A1* | 11/2001 | Fujiwara | G06K 9/00456 |
| | | | 382/181 |
| 2008/0093027 A1* | 4/2008 | Niwa | B41J 3/4075 |
| | | | 156/387 |
| 2008/0101726 A1* | 5/2008 | Myers | G06K 9/3258 |
| | | | 382/289 |
| 2009/0241047 A1* | 9/2009 | Kuwahara | G05B 19/409 |
| | | | 715/765 |
| 2009/0287470 A1 | 11/2009 | Farnsworth et al. | |
| 2010/0122161 A1 | 5/2010 | Jardine-Skinner et al. | |
| 2010/0145676 A1 | 6/2010 | Rogers | |
| 2010/0180197 A1* | 7/2010 | Ohashi | G06F 17/212 |
| | | | 715/256 |
| 2010/0199195 A1* | 8/2010 | Carounanidy et al. | 715/760 |
| 2010/0235767 A1* | 9/2010 | Hammack | G06T 3/0012 |
| | | | 715/763 |
| 2010/0251146 A1* | 9/2010 | Williams | G06F 3/04817 |
| | | | 715/764 |
| 2011/0273474 A1* | 11/2011 | Iwayama | H04N 5/23219 |
| | | | 345/636 |

* cited by examiner

| normal display |  |
|---|---|
| complete horizontal truncation |  |
| partial horizontal truncation |  |
| vertical truncation |  |

METHOD AND APPARATUS OF TESTING A COMPUTER PROGRAM

RELATED APPLICATIONS

This application is based on and claims the benefit of priority from Chinese Patent Application 201210266218.2, filed on Jul. 30, 2012, the entire disclosure of which is incorporated herein by reference.

TECHNICAL FIELD

The present disclosure generally relates to the field of data processing, and more specifically, to a method and apparatus of testing a computer program.

BACKGROUND

During the procedure of testing a computer program, Graphic User Interface (GUI) test is an important part. GUI test may find problems that might cause a user's incorrect operation or inconvenience in operation in GUI of the computer program. A typical type of such a problem is character truncation. A GUI may include many character regions for indicating user to operate. Representation of a character region in computer program is just visual object(s) and character string(s) associated therewith. During development of a computer program, matching between display size setting of a character string and that of a visual object might be ignored. While translating the computer program from one language into another, actual display size of the character string may change. All of these reasons may cause character truncation. Character truncation may make some characters become invisible on the GUI, so that it fails to effectively direct the user's operation.

SUMMARY

Embodiments of the disclosure may provide a method and apparatus of testing a computer program.

The method of testing a computer program according to embodiments of the disclosure may include: acquiring first display data of a character region in a Graphical User Interface (GUI) of the computer program; reducing display size setting of an original character string associated with the character region; acquiring second display data of the character region in refreshed GUI; and generating a message indicating character truncation when there is a difference other than actual display size of character between the first display data and the second display data.

The apparatus of testing a computer program according to embodiments of the disclosure may include: a first acquiring means configured to acquire first display data of a character region in a Graphical User Interface (GUI) of the computer program; a display size setting means configured to reduce display size setting of an original character string associated with the character region; a second acquiring means configured to acquire second display data of the character region in refreshed GUI; and a character truncation detecting means configured to generate a message indicating character truncation when there is a difference other than actual display size of character between the first display data and the second display data.

With the method and apparatus of the disclosure, at least one type of character truncation present in GUI may be automatically detected.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some example embodiments will be described in more detail with reference to the accompanying drawings, in which the example embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
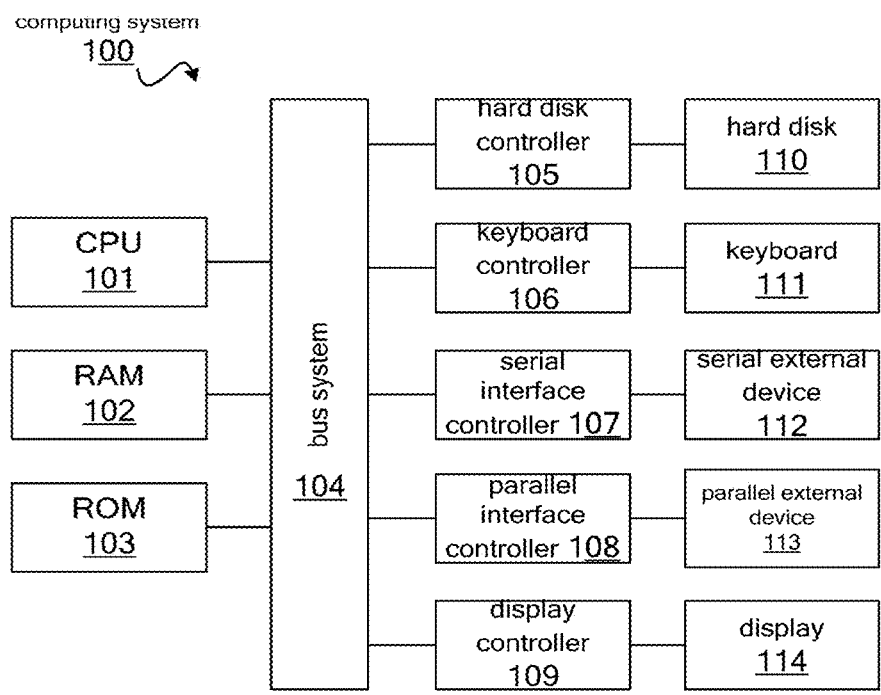
FIG. 1 is a block diagram of an exemplary computer system 100 which is applicable to implement example embodiments of the disclosure.

FIG. 1 shows an example computer system 100 which is applicable to implement the embodiments of the present disclosure. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the example purpose rather than any limitation to the present disclosure. In some cases, some devices may be added to or removed from the computer system 100 based on specific situations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to an example embodiment, in order to judge whether character truncation occurs for a character region in GUI test, the visual object corresponding to that character region may be acquired, and a character string associated with the visual object. The character string associated with that visual object may be compared to the character string displayed by GUI to see whether they are the same. The character string associated with the visual object may be acquired by checking source code of the computer program. Often, there are a large number of visual objects in GUI of a computer program. It may be impractical to check source code for these visual objects one by one. In some embodiments, the present disclosure may automatically find character truncation problems.

Figure 2:
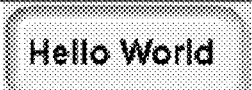
FIG. 2 is a diagram of character truncation, according to an example embodiment of the disclosure.
Figure 2:
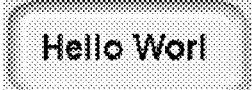
Figure 2:
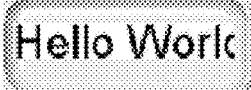
Figure 2:
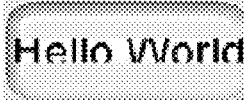

FIG. 2 is a diagram of character truncation. Although English letters are taken as example of the characters in FIG. 2 and in other subsequent drawings, the method provided by embodiments of the disclosure may be applied to other various characters, including but not limited to, Chinese characters.

As shown in FIG. 2, by checking source code of the computer program, a character string associated with the visual object may be Hello World. Hereinafter, character string associated with a visual object in source code of computer program may be referred as original character string. Horizontal truncation refers to a situation that, due to a width of actual display size of the visual object being insufficient, characters at an end of the original character string can not be displayed normally. For example, in a case of complete horizontal truncation, the character d is not displayed on GUI at all. In case of partial horizontal truncation, a portion of character d is not displayed on GUI. Vertical truncation refers to a situation that, due to a height of actual display size of visual object being insufficient, the part of the character string whose height is above a certain extent or the entire character can not be displayed normally. In case that there may only be vertical truncation, the number of displayed characters generally does not change.

Figure 3:
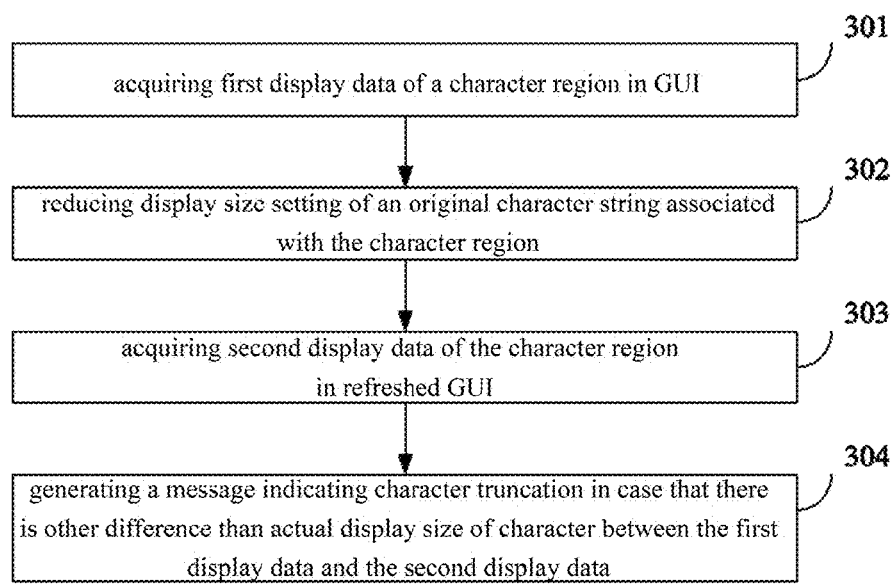
FIG. 3 is a flowchart of a method of detecting character truncation according to example embodiments of the disclosure.

FIG. 3 is a diagram of a method of detecting character truncation according to example embodiments of the disclosure. It should be noted that, the disclosure not necessarily solve detection with respect to all the above types of character truncation. Some embodiments of the disclosure may have better performance when detecting complete horizontal truncation, whereas other embodiments may have better performance when detecting partial horizontal truncation or vertical truncation.

In step 301, first display data of a character region in GUI of a computer program may be acquired.

As stated above, in a computer program, character data in GUI may correspond to at least one visual object and original character string(s) associated therewith. Generally, attributes of a visual object may include coordinates of that visual object. Thus, location of the character region in GUI may be determined via the coordinates.

Alternatively, location of the character region may be specified by a tester. For example, after GUI is displayed on a display device of a computer system, the tester may specify a location of the character region by using input device such as mouse, keyboard.

After location of the character region has been determined, display data of the character region may be acquired. For example, the display data may be acquired by printing screen.

In step 302, a display size setting of an original character string associated with the character region may be reduced.

Those skilled in the art can easily reduce display size setting of an original character string. For example, word size of the original character string may be reduced in code of the computer program, or boldface display of the original character string may be canceled in code of the computer program. In this way, after GUI has been refreshed, character string associated with the character region may be displayed in the character region in a smaller actual display size.

In step 303, second display data of the character region in refreshed GUI may be acquired.

This step may similar to step 301 and comprehensive description thereof will be omitted for brevity.

In step 304, a message indicating character truncation may be generated in a situation in which there is a difference other than actual display size of character between the first display data and the second display data.

Since display size setting of the original character string may have been adjusted in step 302, the first display data may necessarily be different from the second display data in actual display size of character. According to embodiments of the disclosure, it may be considered that character truncation occurs if there is a difference other than actual display size of character.

An example of judging whether there is a difference between the first display data and the second display data, other than actual display size of character, will be described in detail with respect to complete horizontal truncation, partial horizontal truncation and vertical truncation, respectively.

Figure 4:
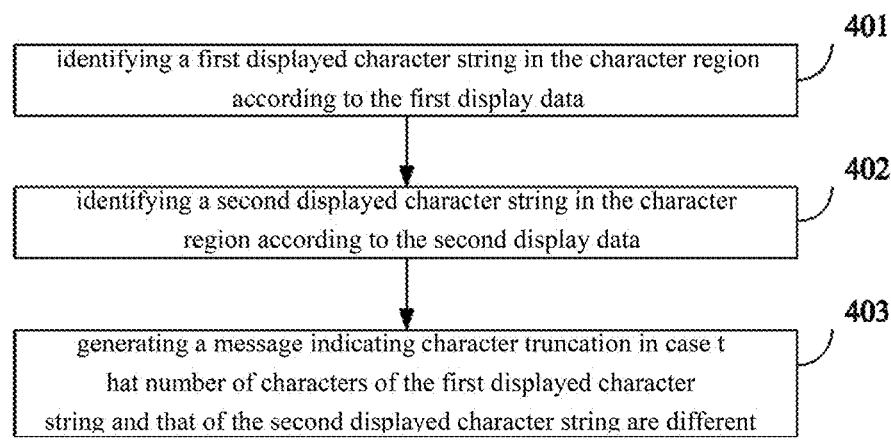
FIG. 4 is a flowchart of a method of detecting character truncation according to example embodiments of the disclosure.

As for complete horizontal truncation, the implementation of step 304 is shown in FIG. 4.

In 401, a first displayed character string in the character region according to the first display data may be identified.

There are already many methods for performing character recognition in the art, and they will be omitted here for brevity.

In step 402, a second displayed character string in the character region according to the second display data may be identified.

In step 403, a message indicating character truncation may be generated in a case in which the number of characters of the first displayed character string and that of the second displayed character string may be different.

In a case of complete horizontal truncation, due to a width of actual display size of the visual object being insufficient, part of characters at end of the original character string can not displayed, and this part of characters may be referred to as un-displayed character string. At least a portion of at least a first character in the un-displayed character string may be made to appear in the character region by reducing a display size setting of the original character string. Thus, number of characters in the displayed character string obtained before and after reducing display size setting may vary.

Figure 5A:
FIG. 5A-5C show a diagram of detecting character truncation, according to an example embodiment of the disclosure.
Figure 5B:
Figure 5C:

FIGS. 5A-5C shows a diagram of detecting character truncation according to the method shown in FIG. 4. The original character string is Hello.

It is assumed for the example that initial font size is 24, and display data acquired in step 301 is shown in FIG. 5A. In step 302, a display size setting of original character string may be reduced by setting font size as 18. In step 303, the acquired display data is shown in FIG. 5B. Accordingly, the first displayed character string identified in step 401 is Hell, the number of characters is 4; the second displayed character string identified in step 402 is Hello, the number of characters is 5. Accordingly, the number of characters may be different between the first displayed character string and the second displayed character string, thus it may be considered that character truncation occurs.

Assuming that initial font size is 20, display data acquired in step 301 is shown in FIG. 5C. In step 302, display size setting of original character string may be reduced by setting font size as 18. In step 303, the acquired display data is shown in FIG. 5B. Accordingly, the first displayed character string identified in step 401 is Hello, the number of characters is 5; the second displayed character string identified in step 402 is Hello, the number of characters is also 5. The number of characters may be the same between the first displayed character string and the second displayed character string, thus it may be considered that there is no character truncation.

Figure 6:
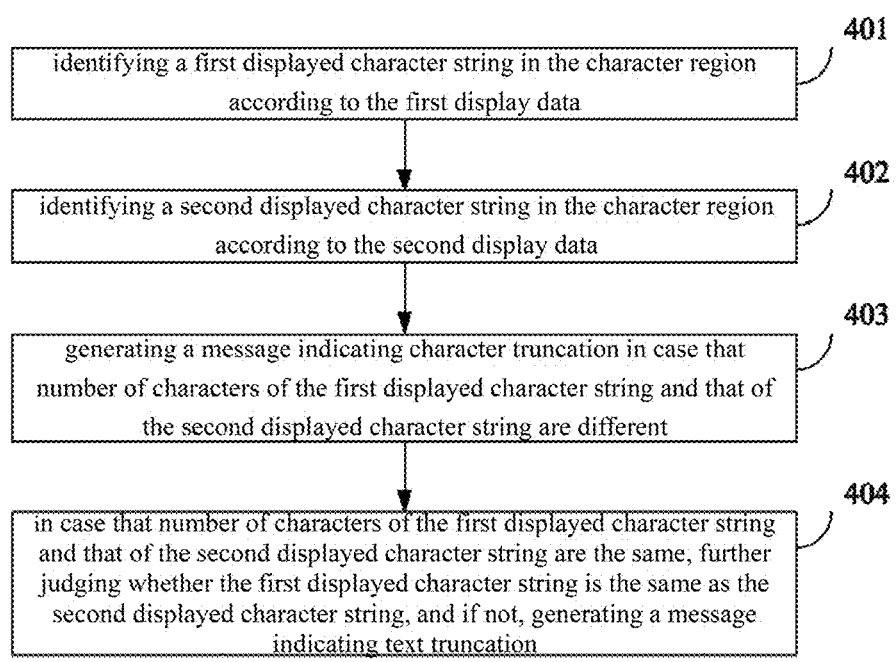
FIG. 6 is a flowchart of a method of detecting character truncation according to example embodiments of the disclosure.

FIG. 6 is an implementation of step 304 according to another embodiment of the disclosure. Wherein, steps 601 to 603 are the same as steps 401 to 403, and they will be omitted for brevity.

In step 604, in a case that the number of characters of the first displayed character string and that of the second displayed character string are the same, the method may further include judging whether the first displayed character string is the same as the second displayed character string, and if not, the method may include generating a message indicating text truncation.

Figure 7A:
FIG. 7A-7C show a diagram of detecting character truncation, according to an example embodiment of the disclosure.
Figure 7B:

Referring to FIGS. 7A and 7B. The original character string is still Hello.

It is assumed for the example that initial font size is 22, display data acquired in step 301 is shown in FIG. 7A. In step 302, a display size setting of original character string is reduced by setting font size as 18. In step 303, the acquired display data is shown in FIG. 7B. Accordingly, the first displayed character string identified in step 601 may be Hellc, the number of characters is 5; the second displayed character string identified in step 602 is Hello, the number of characters is also 5. Thus, number of characters of the first displayed character string and that of the second displayed character string may be the same.

FIG. 7A depicts an example of partial horizontal truncation, that is, a portion of character o is displayed in GUI. Character recognition software may identify a portion of the displayed o as c. Accordingly, number of characters of the first displayed character string and that of the second displayed character string may be the same.

Thus, in a case that number of characters of the first displayed character string and that of the second displayed character string are the same, whether the first displayed character string and the second displayed character string themselves are the same may be further judged so as to detect partial horizontal truncation.

Figure 7C:

It is assumed for the purpose of example that initial font size is 20, display data acquired in step 301 is shown in FIG. 7C. In step 302, display size setting of original character string may be reduced by setting font size as 18. In step 303, the acquired display data is also as shown in FIG. 7B. Accordingly, the first displayed character string identified in step 601 is Hello, the number of characters is 5. The second displayed character string identified in step 602 is Hello, the number of characters is also 5. Thus, the number of characters of the first displayed character string and that of the second displayed character string may be the same, and the first displayed character string and the second displayed character string themselves may be the same, thus it may be determined that there is no truncation.

According to an embodiment of the disclosure, only the last character of the first displayed character string and the second displayed character may be compared. This can save computer resource for comparing characters.

The method shown in FIG. 6 may also be applicable to vertical truncation. This is because, in a case of vertical truncation, although number of characters of the displayed character string may not change, some characters of the displayed character string may vary in truncation extent before and after adjusting display size setting of original character string. For a same character with different truncation extent, character recognition software may identify it as a different character. For example, for character "d" in case of vertical truncation shown in FIG. 2, character recognition software may identify the truncated character "d" as character "o" or "a". Thus, vertical truncation may also be detected by comparing the first displayed character string and the second displayed character string themselves.

According to an embodiment of the disclosure, in step 302, a sum of an amount of horizontal reduction in actual display size of the first displayed character string may be made to be larger than horizontal spacing of characters in the first displayed character string by reducing a display size setting of the original character string. In a case that a sum of amount of horizontal reduction in actual display size of the first displayed character string is larger than horizontal spacing of characters in the first displayed character string, it may be assumed that at least a portion of at least one character of the un-displayed character string is displayed in character region in the refreshed GUI. It may be appreciated that, the larger the number of characters in the displayed character string, the larger the sum of the amount of horizontal reduction in actual display size of the displayed character string.

According to another embodiment of the disclosure, in step 302, a sum of an amount of horizontal reduction in actual display size of the first displayed character string may be made to be larger than a horizontal spacing of characters in the first displayed character string plus actual display size of blank space by reducing a display size setting of the original character string. This may be because, the first character in the un-displayed character string and the last character in the first displayed character string may belong to different words, respectively.

According to still another embodiment of the disclosure, in step 302, actual display size of character may be made to be a minimum size that can be processed by character recognition software by reducing a display size setting of the original character string.

Other criteria for determining reduction extent in display size setting of original character string based on features of character may also be utilized.

The implementation of step 304 according to yet another embodiment of the disclosure will be described in conjunction with FIG. 8.

In step 801, first character display data according to the first display data may be acquired.

Step 801 may differ from step 401 in that, step 801 may not need to perform character recognition, rather, it may only need to acquire display data of character. Generally, according to a display size setting of original character string, a width of a character may change within a certain range. Thus, according to an embodiment of the disclosure, display data of such a region in character region may be truncated as the first character display data: it may start from left or right edge of the character region, its height may be that of the character region, and its width may be any preset value within that range. The preset value may be a middle value or an average value of that range, for example.

According to another embodiment of the disclosure, the width may not be preset, rather, it may be dynamically determined based on the first display data. For example, character recognition technology may often include two steps: the first step may be to determine which part of display data needs to be recognized, that is, determine which part of display data may be character display data representing single character; the second step may be to conduct pattern recognition on the character display data, so as to determine character corresponding to the character display data. The width may be determined by using the first step.

In step 802, second character display data according to the second display data may be acquired.

This step may be similar to step 801.

In step 803, a message indicating character truncation may be generated in a case that character portion in the first character display data and character portion in the second character display data have different aspect ratio.

If there is no vertical truncation, height and width of character display data may change in same ratio before and after reducing display size setting of original character string, thus aspect ratio of the character display data may not change.

If there is vertical truncation, then a portion of characters in vertical direction may not be displayed, however, it may be completely displayed in horizontal direction. After reducing display size setting of original character string, the portion that previously may not have been displayed can be displayed, such that a change in a ratio of height of character display data may exceed that of width. Accordingly, aspect ratio of character display data may change.

Figure 8:
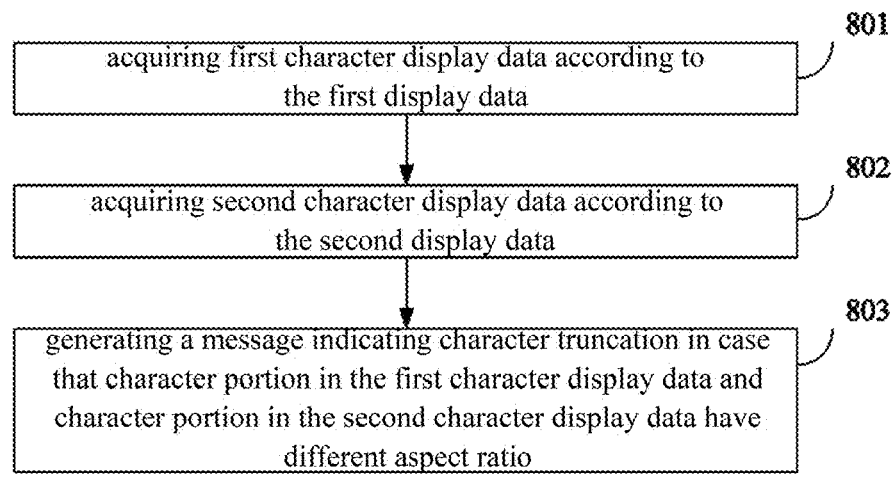
FIG. 8 is a flowchart of a method of detecting character truncation according to example embodiments of the disclosure.
Figures 9A, 9B, 9C:
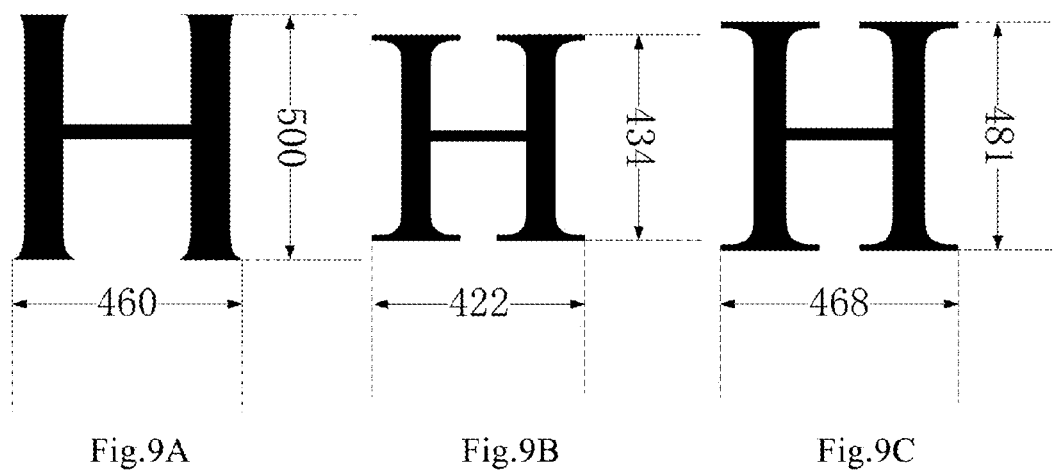
FIG. 9A-9C show a diagram of detecting character truncation, according to an example embodiment of the disclosure.

FIGS. 9A-9C shows a diagram of detecting character truncation according to the method shown in FIG. 8.

Assuming that initial font size is 24, first character display data acquired in step 801 is shown in FIG. 9A, and width of the character display data may be 460, height may be 500, and the aspect ratio may be 0.92. In step 302, a display size setting of original character string may be reduced by setting font size as 18. The second character display data acquired in step 402 is shown in FIG. 9B, and width of the character display data may be 422, height may be 434, and the aspect ratio may be 0.97. Before and after changing the display size setting of original character string, the aspect ratio of the first character display data and the second character display data changes, thus it may be determined that character truncation has occurred.

Assuming that initial font size is 20, first character display data acquired in step 801 is shown in FIG. 9C, and width of the character display data may be 468, height may be 481, and the aspect ratio may be 0.97. In step 302, a display size setting of original character string may be reduced by setting font size as 18. The second character display data acquired in step 402 is also shown in FIG. 9B, and width of the character display data may be 422, height may be 434, and the aspect ratio may be 0.97. Before and after changing display size setting of original character string, aspect ratio of the first character display data and the second character display data does not change, thus it may be determined that character truncation has not occurred.

Figure 10:
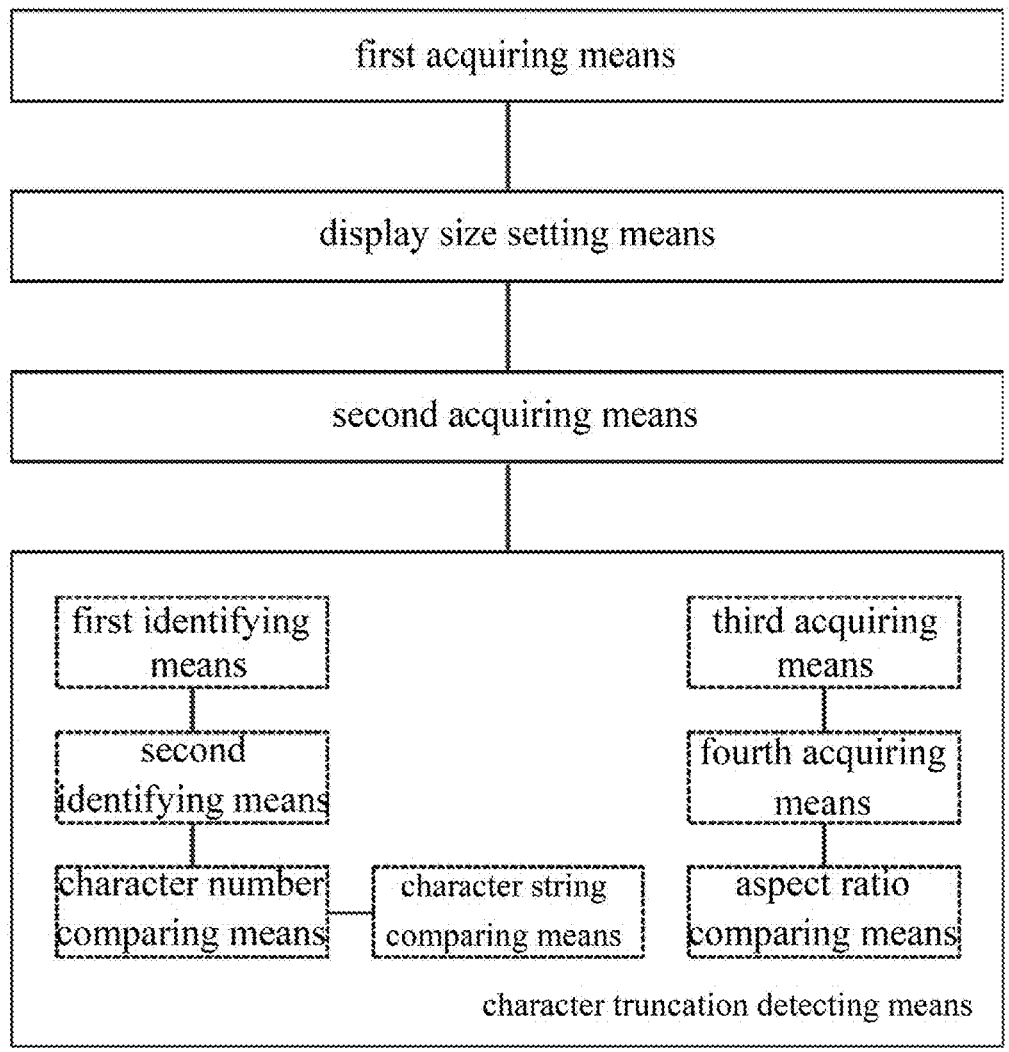
FIG. 10 is a block diagram of an apparatus of detecting character truncation according to example embodiments of the disclosure.

FIG. 10 is a block diagram of an apparatus of testing a computer program according to embodiments of the disclosure. In some embodiments, the described means may include one or more processors configured to perform described functionality. In some embodiments, the described means may include software code and/or instructions for causing a processor to perform the described functionality. Such software code and/or instructions may be stored on a computer readable medium, as described herein. Accordingly, the described means may include hardware, software, and/or combinations thereof.

The apparatus may include:

a first acquiring means configured to acquire first display data of a character region in a Graphical User Interface (GUI) of the computer program;

a display size setting means configured to reduce a display size setting of an original character string associated with the character region;

a second acquiring means configured to acquire second display data of the character region in refreshed GUI; and a character truncation detecting means configured to generate a message indicating character truncation in a case that there is a difference other than actual display size of character between the first display data and the second display data.

The character truncation detecting means may include:

a first identifying means configured to identify a first displayed character string in the character region according to the first display data;

a second identifying means configured to identify a second displayed character string in the character region according to the second display data; and a character number comparing means configured to generate the message indicating character truncation in a case that a number of characters of the first displayed character string and that of the second displayed character string are different.

The character truncation detecting means may further include:

a character string comparing means configured to, in a case that number of characters of the first displayed character string and that of the second displayed character string are the same, further judge whether the first displayed character string is the same as the second displayed character string, and if not, generate a message indicating text truncation.

The character truncation detecting means may include:

a third acquiring means configured to acquire first character display data according to the first display data;

a fourth acquiring means configured to acquire second character display data according to the second display data; and an aspect ratio comparing means configured to generate a message indicating character truncation in a case that a character portion in the first character display data and a character portion in the second character display data have different aspect ratio.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of testing a computer program, the method comprising:

acquiring, by one or more processors, first display data of a character region in a Graphical User Interface (GUI) of the computer program by printing screen of the displayed GUI;

reducing, by the one or more processors, a display size setting of an original character string associated with the character region;

acquiring, by the one or more processors, second display data of the character region in a refreshed GUI;

acquiring first character display data according to the first display data;

acquiring second character display data according to the second display data;

generating, by the one or more processors, a message indicating character truncation when a character portion in the first character display data and a character portion in the second character display data have a different aspect ratio;

identifying a first displayed character string in the character region according to the first display data;

identifying a second displayed character string in the character region according to the second display data; and generating the message indicating character truncation when a number of characters of the first displayed; when the number of characters of the first displayed character string and that of the second displayed character string are the same, further judging whether the first displayed character string is the same as the second displayed character string, and if not, generating the message indicating text truncation.

2. The method according to claim 1, wherein a sum of an amount of horizontal reduction in actual display size of the first displayed character string is made to be larger than horizontal spacing of characters in the first displayed character string by reducing the display size setting of the original character string.

3. The method according to claim 1, wherein a sum of an amount of horizontal reduction in actual display size of the first displayed character string is made to be larger than horizontal spacing of characters in the first displayed character string plus actual display size of blank space by reducing the display size setting of the original character string.

4. The method according to claim 1, wherein actual display size of a character is made to be a minimum size that can be processed by character recognition software by reducing the display size setting of the original character string.

5. An apparatus of testing a computer program, the apparatus comprising:

a first acquiring means configured to acquire first display data of a character region in a Graphical User Interface (GUI) of the computer program by printing screen of the displayed GUI;

a display size setting means configured to reduce display size setting of an original character string associated with the character region;

a second acquiring means configured to acquire second display data of the character region in refreshed GUI; and a third acquiring means configured to acquire first character display data according to the first display data;

a fourth acquiring means configured to acquire second character display data according to the second display data;

a character truncation detecting means configured to generate a message indicating character truncation including an aspect ratio comparing means configured to generate the message indicating character truncation when a character portion in the first character display data and a character portion in the second character display data have a different aspect ratio when there is a difference other than actual display size of a character between the first display data and the second display data after refreshing the GUI;

a first identifying means configured to identify a first displayed character string in the character region according to the first display data;

a second identifying means configured to identify a second displayed character string in the character region according to the second display data;

a character number comparing means configured to generate the message indicating character truncation when a number of characters of the first displayed character string and that of the second displayed character string are different; and a character string comparing means configured to, when the number of characters of the first displayed character string and that of the second displayed character string are the same, further judge whether the first displayed character string is the same as the second displayed character string, and if not, generate the message indicating text truncation.

6. The apparatus according to claim 5, wherein a sum of an amount of horizontal reduction in actual display size of the first displayed character string is made to be larger than horizontal spacing of characters in the first displayed character string by reducing the display size setting of the original character string.

7. The apparatus according to claim 5, wherein a sum of an amount of horizontal reduction in actual display size of the first displayed character string is made to be larger than horizontal spacing of characters in the first displayed character string plus actual display size of blank space by reducing the display size setting of the original character string.

8. The apparatus according to claim 5, wherein actual display size of a character is made to be minimum size that can be processed by character recognition software by reducing the display size setting of the original character string.

\* \* \* \* \*